United States Patent Office 2,994,339
Patented Aug. 1, 1961

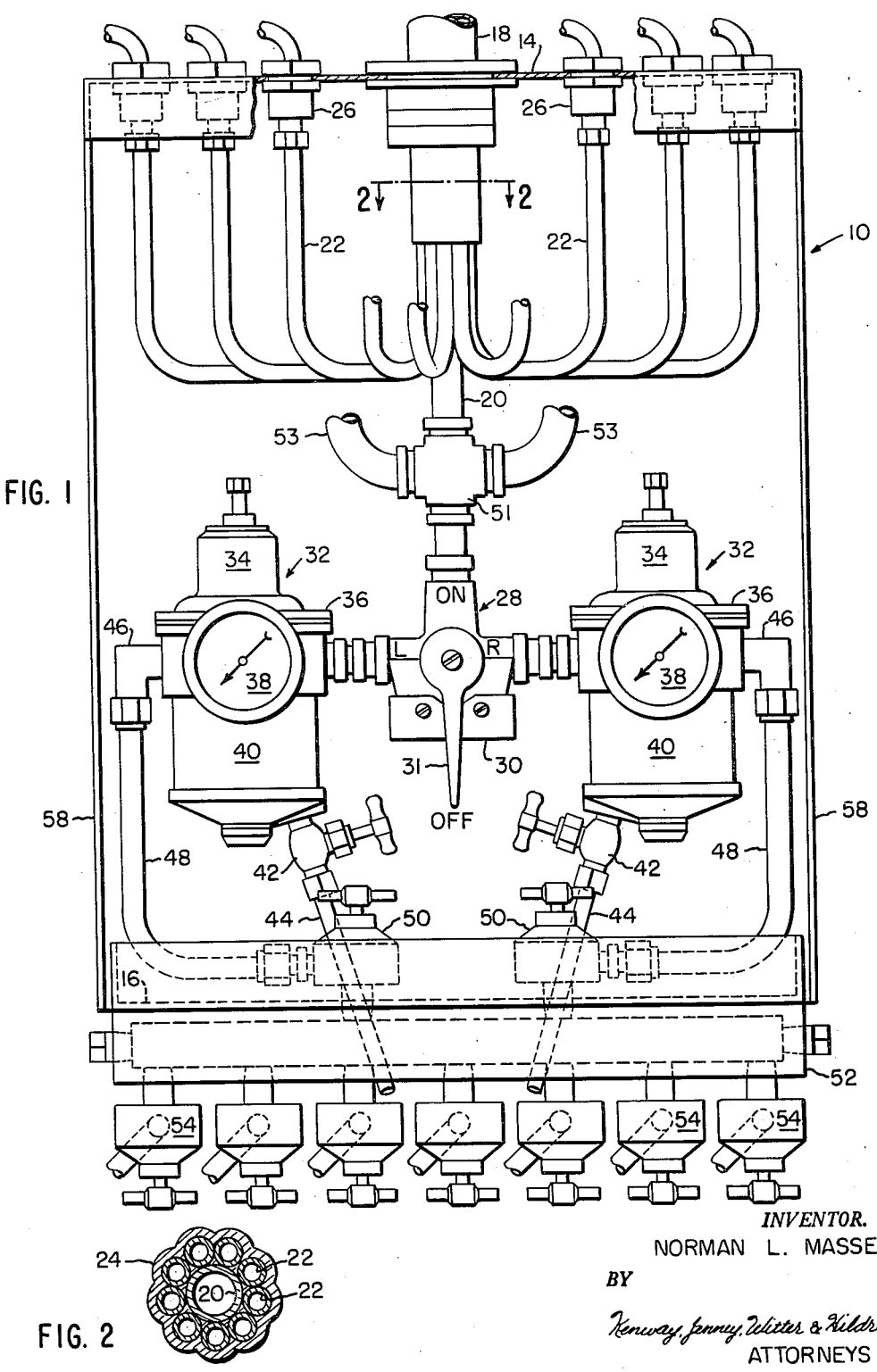

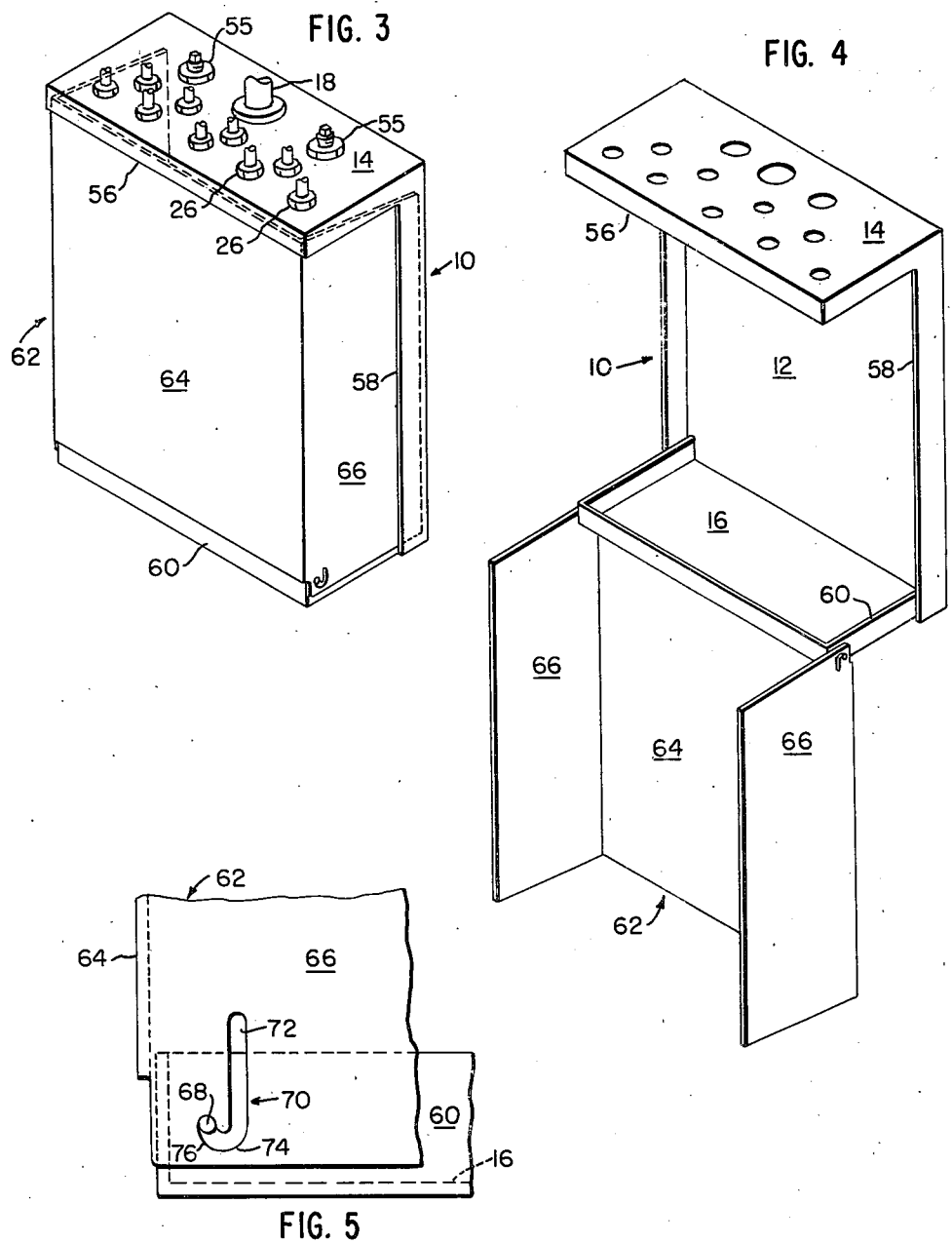

2,994,339
INTEGRATED OPERATING AIR SUPPLY AND AIR SIGNAL TRANSMISSION SERVICE CENTER
Norman L. Massey, Middleboro, Mass., assignor to Badger Manufacturing Company, Cambridge, Mass., a corporation of Massachusetts
Filed Apr. 22, 1959, Ser. No. 808,254
5 Claims. (Cl. 137—343)

This invention relates to the distribution of operating air as well as air signals in a pneumatic system for instruments and control equipment.

In chemical and petroleum processing plants, fluid process control equipment, such as valves, are often pneumatically operated, with the control equipment being actuated by means responsive to pneumatic signals from transducers or the like operatively associated with instruments for measuring variables such as temperature, flow rate, etc. The air supply requirement for the operation of the control equipment and for providing air to the transducers is usually met by providing a central air supply having a main supply pipe or conduit and branch pipe lines from the main pipe to supply air at a pressure of 30 to 100 p.s.i.g. at the location of each such instrument. It is normal to provide at and for each such instrument a shut-off valve and an airset to provide clean, dry air to the instrument at a reduced constant pressure of perhaps 20 p.s.i.g. For the purposes of this discussion as well as the following description and claims, an airset is defined as either a unitary device or a combination of devices for connection to an air supply line and having means such as a pressure regulating valve to provide a constant pressure output, means to filter the output air, and means such as a drip well to assure that the output air from the airset is sufficiently dry. The transmission of pneumatic signals from the transducers and to the actuating means for the control equipment is usually handled by multiple run tubing of a size sufficient to transmit the relatively low pressure signals (3 to 15 p.s.i.g.). The multiple run tubing conducts these signals from the transducers to a central control board, which may be provided with indicating equipment as well as with means for determining the operation of the control equipment in response to variations in the pneumatic signals. Thus, a network of air supply lines is utilized to supply operating air to individual airsets at each piece of control equipment, while a separate multiple run tubing system is utilized for pneumatic signal transmission between the measuring and control instruments and the control board. Such an arrangement, of course, requires many separate airsets as well as a rather complex arrangement of conduits and lines, which results in the expenditure of considerable time and expense when a change in location of the control equipment is desired or necessary, particularly with respect to the high pressure lines to the airsets.

Accordingly, it is an object of this invention to provide a novel and improved integrated operating air supply and pneumatic signal transmission system by providing what may be referred to as a service center adapted to be connected to the central high pressure operating air supply and having means to supply constant pressure, clean, dry operating air to a plurality of instruments such as valves or transducers, in the immediate vicinity, and, in addition, having means to collect and distribute air signals between the control board multiple run cables and the same or other adjacent instruments such as transducers, thus eliminating the need for separate operating air and signal transmission networks and also eliminating the need for individual airsets for each piece of equipment utilizing operating air.

It is another object of this invention to provide a service center of the type described which is compact and easily installed and which permits the connection of additional equipment to the operating air supply or to the signal transmission system without disruption of service.

It is still a further object of this invention to provide a casing for a service center of the type described having a novel and improved construction whereby no latches or the like are required to maintain the casing closed while at the same time the casing provides superior protection of equipment located therein against weather damage when the service center is disposed in an exposed location.

The manner in which the foregoing and other objects of the invention are achieved in a preferred embodiment of the invention will be apparent from a consideration of the following description thereof taken in connection with the accompanying drawings illustrating the same and in which:

FIG. 1 is a front view of a service center constructed in accordance with the invention and with the cover or door removed;

FIG. 2 is an enlarged cross section substantially along the line 2—2 of FIG. 1;

FIG. 3 is a reduced perspective view of the service center of FIG. 1 with the cover in place and closed;

FIG. 4 is a perspective view of the casing of the service center of FIG. 3 with the cover open; and FIG. 5 is an enlarged fragmentary view of a portion of the casing of FIG. 4.

With reference to the drawings and particularly FIG. 1, a preferred embodiment of a service center constructed in accordance with the invention is shown as comprising a casing 10 having a flat rectangular rear wall 12, a rectangular top wall 14, and a rectangular bottom wall 16.

The top wall is provided with a central opening for the reception of a multiple run tubing or conduit 18 which, as best shown in FIG. 2, comprises a central relatively large diameter tube 20 for carrying high pressure air from a central supply and a plurality of circularly arranged smaller tubes 22 disposed concentrically about the central tube 20 for carrying relatively low pressure air signals. The tubes 20 and 22 are maintained in assembly and protected by a sheath 24 of suitable material, such as plastic or metal. As apparent from FIG. 1, after the conduit 18 has been fed through the top of the casing, the sheath 24 is removed from a portion of the end of the conduit disposed within the casing and the separate air signal transmission tubes 22 are respectively connected to the lower ends of a plurality of bulkhead couplings 26 on the top wall 14 of the casing. The upper ends of connectors or couplings 26 may be connected to air signal tubing from individual instruments in the immediate vicinity. In order to prevent dirt or other foreign matter from entering the couplings 26, suitable closures may be provided, if desired.

The central high pressure air tubing 20 of the conduit 18 is connected to a manually operable valve 28 mounted on a bracket 30 on the rear wall of the casing. The valve is provided with an operating handle 31 and with a pair of outlets connected respectively to a pair of airsets 32 and 33, with the coupling or tubing which connects the valve and airsets also supporting the airsets within the casing. The valve 28 is preferably of a four-position type constructed to permit selective connection of the tube 20 to either or both of the airsets or the disconnection of both airsets from the tube 20. The airsets 32 and 33 each generally comprise a filter portion 34, a pressure regulating portion 36 having a pressure gauge 38, and a drip well portion 40. Each drip well portion is provided with a drain in the bottom thereof, with a valve 42 connected to the drain and to a drain tube 44 for the removal of water collected in the drip well.

Each airset has an outlet connected by an elbow 46 to tubing 48, in turn connected to a valve 50 at the bottom of the casing. The valve 50 is connected to a manifold 52 mounted on the underside of the bottom wall 16 of the casing, with the manifold being provided at its underside with a plurality of additional valves 54 adapted to be connected to air operated control equipment or transducers for the supply of operating air thereto. If desired, as shown in FIG. 1, a connector 51 may be installed between the valve 28 and central air supply line 20 to provide for the connection of lines 53 between the supply line 20 and a plurality of connectors 55 mounted on the top wall 14 of the casing as shown in FIG. 3. In this manner, a supply of air at central air line pressure is also available at the service center, if needed. It should be here noted that it is preferred that the connectors 55 be substantially larger than the connectors 26 so as to preclude the inadvertent connection of an air signal line to one of the high pressure connectors 55.

As is best shown in FIGS. 3 to 5 of the drawings, the top wall 14 of the casing is provided with a depending lip or flange 56 along its side and front edges and merging at its rearward ends to form an extension of a side flange or lip 58 on the rear wall 12 extending at right angles and forwardly thereof. The bottom wall 16 is provided with an upstanding flange 60 along its side and front edges, with the side portions of the flange 60 being spaced inwardly from and between the flanges 58 on the rear wall, as best shown in FIG. 1.

The casing 10 also includes a cover 62 comprising a flat rectangular cover plate 64 forming the front wall of the casing. Integral side walls 66 extend at right angles and rearwardly from the side edges of the cover plate 64 to provide a U-shaped configuration to the cover. The flat, generally rectangular side walls 66 are pivotally mounted on the side portions of the flange 60 on the bottom wall by means of pins 68 on the flange which are slidably received in J-shaped slots 70 in the side walls 66, all as most clearly shown in FIG. 5.

The spacing of the forward walls of the cover is selected to be such that the rear edge portions of the side walls 66 are receivable between the side flanges 58 on the rear wall and the side portions of the flange 60 on the bottom wall when the cover is in its closed position. Further, the cover plate 64 and side walls 66 are longitudinally and laterally dimensioned so that when the cover is in the closed position of FIG. 3 the top edge portions of the cover plate and side walls will project upwardly behind or, in other words, be telescopically received within the depending flange 56 on the top wall 14, and the bottom edge portions of the cover of the plate will overlie at least a part of the front portion of the flange 60 on the bottom wall.

To close the cover from its open position, shown in FIG. 4, wherein the pins 68 are located in the short leg 76 of the slot 70, the cover is swung upwardly to a near vertical position and then moved downwardly until the pins 68 engage the terminal end of the long legs of the slots. In this position of the cover plate, the top edge portion thereof will be lower than the bottom edge of the depending flange 56 on the top wall of the casing. Thereupon, the cover plate is swung in and lifted until the pins bottom in the bight portion 74 joining the longer leg 72 of the slots 36 with the shorter leg 76, while at the same time slipping the top edges of the cover within the flange 56 on the top wall and simultaneously moving the bottom of the cover inwardly of the casing toward the rear wall. The cover may then be lowered to engage the pins with the terminal ends of the short legs of the slots, whereby the cover will be supported in the closed position shown in FIG. 3. It should here be noted that, as shown in FIGS. 3 and 4, it is preferred that the top edges of the side walls 66 be inclined rearwardly and downwardly to facilitate opening and closing of the cover.

When the cover is in its closed position, shown in FIG. 3, with the top portions of the cover plate and side walls received within the flange 56, and with the rear edges of the side walls received between and behind the side flanges 58 on the rear wall, it can be seen that excellent protection is afforded against the entrance of rain or other foreign matter into the casing. Further, as can be easily seen, no separate latch or lock is required to hold the cover closed in order to assure satisfactory protection of the contents of the casing from weather damage.

In the use of a service center constructed in accordance with this invention, the service center is disposed in a location nearby the instruments and control equipment which it is desired to service. For each instrument transmitter or transducer, two lines would be run to the service center, one for connection to a valve 54 for air supply to the instrument, and the other for connection to a bulkhead coupling 26 for signal transmission to a central control through the conduit 18. Similarly, for each control or control valve either a supply line to a valve 54 or a control signal line from a coupling 26 or both would be provided. The airsets 32 and 33 in the service center provide clean, constant pressure air for the instruments serviced by the center, thus eliminating individual airsets for each air operated piece of equipment and materially reducing the total number of airsets required. The drip wells in each of the airsets provide low-point drains for the operating air distribution system, replacing the drip legs normally installed in operating air supply mains. The provision of the pair of airsets within the service center, along with the dual valving therefor, permits both airsets to be used in parallel during normal operation. In such use, one of the airsets is able to maintain desired air pressure while the other merely idles. If malfunction occurs in one of the airsets, the other will compensate for failure or erratic behavior of the first; and even with one airset fouled, complete failure will not occur. When a malfunctioning has been detected in either airset, it may be easily removed and repaired or replaced without interruption of service to the instruments by reason of the valve 28 being operative to connect either of the airsets, solely, to the central air supply. Normally, the bulkhead signal line connectors on the service center will be the only joints in the transmission lines between the control board and the process area measurement and control devices, which, of course, simplifies the checking of leaks after installation, as well as reducing the possibility of such leakage.

Thus, a service center constructed in accordance with this invention eliminates the separate operating air and air signal network previously necessary and permits new instruments to be added to the system without interruption of service to the ones already operating. The use of such a service center further reduces the material cost of the installation as compared to old unintegrated systems as well as reducing the cost of and facilitating installation, maintenance, and periodic inspection of the system. The improved organization of work during construction of a plant, afforded by service centers of this invention, further contributes to erection economy. In this connection, the service centers may be installed as complete factory built and tested units, resulting in improvement of job scheduling to a point near completion of construction of a plant. Thus, it can be seen that a service center constructed in accordance with this invention completely fulfills the objectives of the invention as well as affording numerous other advantages.

While the invention has been described in terms of a preferred embodiment, it will, of course, be apparent that various modifications and alterations could be made in the specific structure shown without departing from the invention. Accordingly, the foregoing description and accompanying drawings are not to be taken in any way as limiting the invention. Rather, the invention is to be limited only by the appended claims, which shall include within their scope all structure which logically falls within the language of these claims.

What I claim as new and desire to secure by Letters Patent of the United States is:

1. In combination, an integrated operating air supply and a signal transmission service center, and a combination operating air supply and air signal transmission conduit including an operating air line and a plurality of air signal lines, the service center comprising a casing, an airset mounted within the casing and having an inlet connected to said operating air line and having an outlet, a plurality of connectors on the casing respectively connected to said air signal lines for connecting said air signal line to a plurality of instruments for providing an air signal or being operable in response to air signals, and a plurality of valves supported by the casing and connected to the outlet of the airset and being adapted to be connected respectively to a plurality of air operated instruments.

2. An integrated operating air supply and air signal transmission service center comprising a casing having an opening for receiving a combination operating air supply and air signal transmission conduit of a type including an operating air line and a plurality of air signal transmission lines, a control valve mounted within the casing and having an inlet for connection to an operating air line of said conduit and having an outlet, an airset mounted within the casing and having an inlet connected to the outlet of said valve and having an outlet, a manifold mounted on the casing, said outlet of said airset being connected to the manifold, a plurality of valves connected to the manifold and each having means for connection to an instrument, and a plurality of means on the casing for connection respectively to the air signal transmission lines of said conduit and having means for connection to an air signal line to or from an instrument.

3. An integrated operating air supply and air signal transmission service center comprising a casing having an opening for receiving a combination operating air supply and air signal transmission conduit of a type including an operating air line and a plurality of air signal transmission lines, a plurality of connectors on the casing for connection respectively to the air signal lines of said conduit, a pair of airsets mounted in the casing each having an inlet and an outlet, a valve mounted on the casing having an inlet for connection to an operating air line of said conduit and having a pair of outlets connected respectively to the inlets of said airsets, the valve being constructed to provide selective connection of the inlet of the valve to one or both of the airsets and to disconnect both airsets from the valve inlet, and a plurality of valves on the casing having inlets connected to the outlets of said airsets and having outlets for connection to a plurality of air operated instruments.

4. An integrated operating air supply and air signal transmission service center comprising a casing having means for receiving an operating air line and a plurality of air signals transmission lines, a control valve mounted within the casing having an inlet for connection to said operating air line and having a pair of outlets, said valve being constructed to provide selective connection of the inlet thereof to one or both of the outlets thereof and to disconnect the valve inlet from both valve outlets, a pair of airsets mounted on the casing and each having an inlet connected to the adjacent one of the outlets of said valve, each of the airsets further having an outlet, a manifold mounted on the casing, means connecting the outlets of the airsets to the manifold, a plurality of shut off valves on the manifold each having an inlet connected thereto and each having an outlet for connection to an air operated instrument, and a plurality of bulkhead connectors on the casing having means within the casing for connection respectively to said plurality of air signal lines and having means externally of the casing for connection to air signal lines to or from a plurality of instruments.

5. An integrated operating air supply and air signal transmission service center comprising a casing having an opening adjacent the top thereof for receiving a combination operating air supply and air signal transmission conduit of a type including an operating air line and a plurality of air signal transmission lines, a manually operable control valve mounted on and within the casing and having an inlet for connection to an operating air line of said conduit and having a pair of outlets, said valve being constructed to provide selective connection of the inlet thereof to one or both of the outlets thereof and to disconnect the valve inlet from both valve outlets, a pair of airsets each having an inlet and an outlet, means connecting the inlets of the airsets respectively to the outlets of the valve and supporting the airsets on the valve, a manifold mounted on the casing, means connecting the outlets of the airsets to the manifold, a plurality of shut off valves on the manifold each having an inlet connected thereto and each having an outlet for connection to an instrument, and a plurality of bulkhead connectors on the casing for connection respectively to the air signal lines of said conduit and to air signal lines to or from a plurality of instruments.

References Cited in the file of this patent

UNITED STATES PATENTS

| | | |
|---|---|---|
| 1,971,908 | Fullman | Aug. 28, 1934 |
| 2,613,082 | Guild | Oct. 7, 1952 |
| 2,781,780 | Zahradka | Feb. 19, 1957 |
| 2,881,940 | Hamilton | Apr. 14, 1959 |